(12) United States Patent
Scognamiglio et al.

(10) Patent No.: US 6,847,738 B1
(45) Date of Patent: Jan. 25, 2005

(54) SHARPNESS ENHANCEMENT (75) Inventors: Gaetano Scognamiglio, Monfalcone (IT); Andrea Rizzi, Venice (IT); Luigi Albani, Merate (IT); Giovanni Ramponi, Trieste (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/623,789

(22) PCT Filed: Jan. 14, 2000

(86) PCT No.: PCT/EP00/00351
§ 371 (c)(1),
(2), (4) Date: Sep. 8, 2000

(87) PCT Pub. No.: WO00/42778
PCT Pub. Date: Jul. 20, 2000

(30) Foreign Application Priority Data

Jan. 15, 1999 (EP) .............................. 99200102
Mar. 10, 1999 (EP) .............................. 99200722
Jun. 18, 1999 (EP) .............................. 99201965

(51) Int. Cl.$^7$ ............................ G06K 9/40; H04N 1/46
(52) U.S. Cl. ...................................... 382/260; 358/532

(58) Field of Search .................... 382/254, 260–275, 382/180, 278; 358/532, 533; 347/251; 375/254

(56) References Cited

U.S. PATENT DOCUMENTS

| | | | | |
|---|---|---|---|---|
| 5,218,649 A | * | 6/1993 | Kundu et al. | ................ 382/180 |
| 5,379,074 A | * | 1/1995 | Hwang | ........................ 348/606 |
| 5,880,767 A | * | 3/1999 | Liu | ............................... 347/251 |
| 5,896,306 A | * | 4/1999 | Aschwanden | ............... 708/300 |
| 6,005,983 A | * | 12/1999 | Anderson et al. | ........... 382/254 |
| 6,108,455 A | * | 8/2000 | Mancuso | ..................... 382/261 |
| 6,259,823 B1 | * | 7/2001 | Lee et al. | .................... 382/268 |
| 6,281,942 B1 | * | 8/2001 | Wang | ........................ 348/607 |
| 6,285,801 B1 | * | 9/2001 | Mancuso et al. | ........... 382/268 |

* cited by examiner

Primary Examiner—Bhavesh M. Mehta
Assistant Examiner—Kanji Patel
(74) Attorney, Agent, or Firm—Edward W. Goodman (57) ABSTRACT

In a method of sharpness enhancement, an input signal (s) is filtered (HLHP, VLHP) to obtain a filtered signal ($z_x$, $z_y$), the filtered signal is multiplied (M2, M3) by a controllable fraction ($c_x$, $c_y$) to obtain multiplied signals, and the multiplied signals are added (A2) to the input signal (s). The controllable fraction ($c_x$, $c_y$) is generated by a non-linear function (HCF, VCF).

12 Claims, 5 Drawing Sheets

SHARPNESS ENHANCEMENT

BACKGROUND OF THE INVENTION

1. Field of the Invention

The invention relates to a method and device for sharpness enhancement.

In scenarios where TV and PC systems merge their functionality, especially in the home environment, high-quality displaying of video images in PC architectures becomes a challenging issue for industries oriented to the consumer market. Since the spatial resolution of synthetic images of the PC outperforms that of natural video scenes, the desire for improved quality in TV images will increase. The subjective attribute sharpness, which is determinant by the human visual system, is one of the most important factors in the perception of image quality. Despite many algorithms for 2-D sharpness enhancement have already been proposed, their effectiveness drops in this context. In fact, in the image processing literature, it is often implicitly assumed that operators that have been designed for the enhancement of 2-D data can be straightforwardly applied to video sequences too. As far as contrast sharpening is concerned, this is far from true: conventional 2-D techniques introduce many small artifacts and non-homogeneities which are perfectly acceptable in a still picture but become very visible and annoying in an image sequence. Moreover, the visibility of a defect strongly depends on the sequence contents, namely, on the amount of details and of motion.

Moreover, even more attention has to be paid, in the PC environment, to the case of decompressed images like MPEG, AVI, etc. In such cases, indeed, network and bus throughput constraints and limited storage capacity impose the use of compression techniques, often operating at relatively low bit rates, which cause visible blocking effects in the decompressed images. The artificial high frequencies arising along the borders of the blocks themselves are usually amplified by sharpness enhancement algorithms, so that the blocking artifact would be emphasized.

The task of image enhancement techniques is often to emphasize the details of a scene so as to make them more visible to a human viewer or to aid some machine performance (e.g., object identification); at the same time, they should reduce noise or, at least, avoid its amplification. Algorithms for contrast enhancement are often employed in an interactive fashion with the choice of the algorithm and the setting of its parameters being dependent on the specific application on hand.

2. Description of the Related Art

A large number of approaches have been devised to improve the perceived quality of an image (See Ref. [1]). The histogram equalization, a commonly used method, is based on the mapping of the input gray levels to achieve a nearly uniform output gray level distribution (See Refs. [1], [2]). However, histogram equalization applied to the entire image has the disadvantage of the attenuation of low contrast in the sparsely populated histogram regions. This problem can be alleviated by employing local histogram equalization, which is of high computational complexity.

Another method, called statistical differencing, generates the enhanced image by dividing each pixel value by its standard deviation estimated inside a specified window centered at the pixel (Ref. [2]). Thus, the amplitude of a pixel in the image is increased when it differs significantly from its neighbors, while it is decreased otherwise. A generalization of the statistical difference methods includes the contributions of the pre-selected first-order and second-order moments.

An alternate approach to contrast enhancement is based on modifying the magnitude of the Fourier transform of an image while keeping the phase invariant. The transform magnitude is normalized to range between 0 and 1 and raised to a power which is a number between zero and one (Ref. [3]). An inverse transform of the modified spectrum yields the enhanced image. This conceptually simple approach, in some cases, results in unpleasant enhanced images with two types of artifacts: enhanced noise and replication of sharp edges. Moreover, this method is of high computational complexity.

Figure 1:
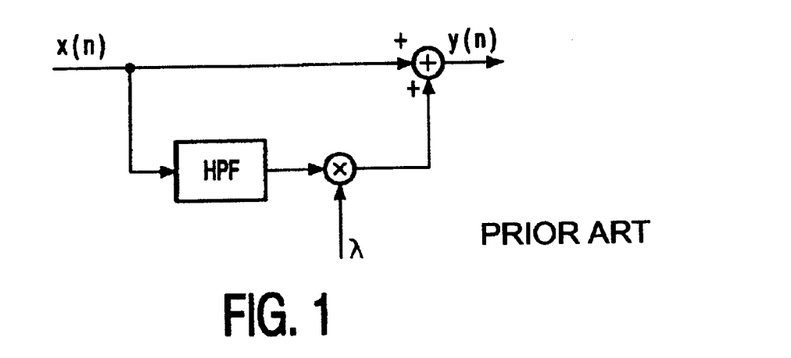
FIG. 1 shows a linear unsharp masking structure.
Figure 2:
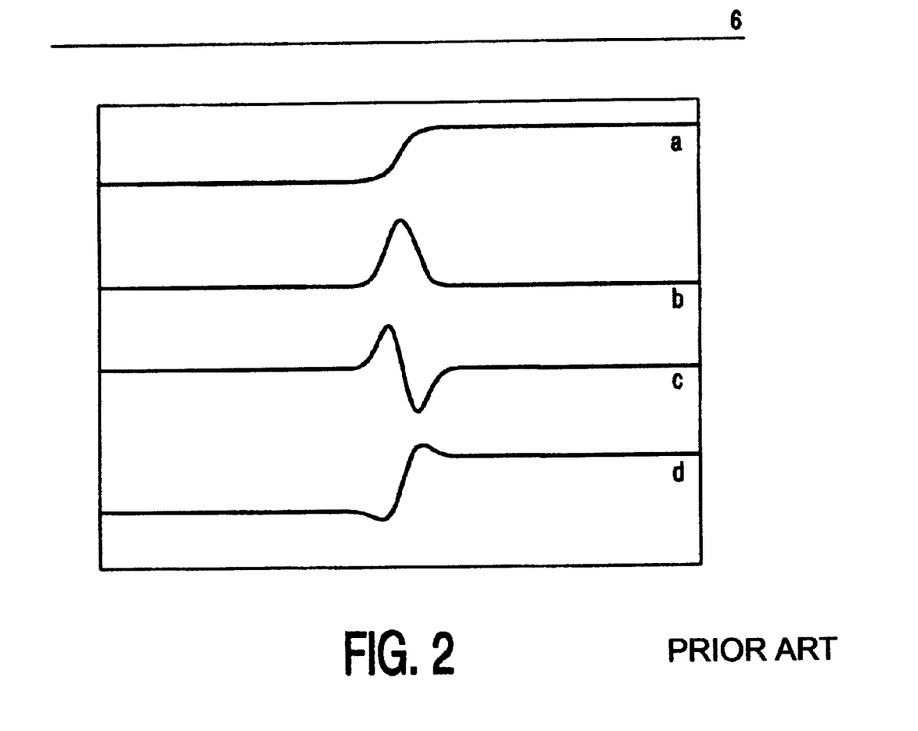
FIG. 2 shows typical behavior of the unsharp masking technique.

A simple linear operator that can be used to enhance blurred images is Unsharp Masking (UM) (Ref. [1]). The unsharp masking approach exploits a property of the human visual system called the Mach band effect. This property describes the visual phenomenon that the difference in the perceived brightness of neighboring region depends on the sharpness of the transition (Ref. [1]); as a result, the image sharpness can be improved by introducing more pronounced changes between the image regions. The fundamental idea of UM is to subtract from the input signal a low-pass filtered version of the signal itself. The same effect can, however, be obtained by adding to the input signal a processed version of the signal in which high-frequency components are enhanced; we shall refer to the latter formulation, schematically shown in FIG. 1. FIG. 1 shows that a linearly high-pass filtered (HPF) version of the input signal $x(n)$ is multiplied by a factor $\lambda$ and thereafter added to the input signal $x(n)$ to form the output signal $y(n)$. The output of the high-pass filter HPF introduce an emphasis which makes the signal variations more sharp. Its effect is exemplified in FIG. 2. In FIG. 2, curve "a" shows the original signal, curve "b" shows a first order derivative of the input signal, curve "c" shows the second order derivative of the input signal, and curve "d" shows the original signal minus k times the second order derivative.

In one dimension, the UM operation, shown by the block diagram in FIG. 1, can be represented mathematically as:

$$y(n)=x(n)+\lambda z(n);$$

where $y(n)$ and $x(n)$ denote the enhanced signal and the original signal, respectively, $z(n)$ means the sharpening component, and $\lambda$ is a positive constant. A commonly used sharpening component is the one obtained by a linear high-pass filter which can be, for example, the Laplacian operation given by $$z(n)=2x(n)-x(n-1)-x(n+1)$$

Even though this method is simple to implement, it suffers from two drawbacks that can significantly reduce its benefits. First, the operator introduces an excessive overshoot on sharp details. Second, it also enhances the noise and/or digitization effect. The former problem comes from the fact that the UM method assigns an emphasis to the high frequency components of the input, amplifying a part of the spectrum in which the SNR (signal-to-noise ratio) is usually low. On the other hand, wide and abrupt luminance transitions in the input image can produce overshoot effects; these are put into further evidence by the human visual system through the Mach band effect.

Several variants of the linear UM technique have been proposed in literature, trying to reduce the noise amplification. A quite trivial approach consists in substituting a bandpass filter for the high-pass one in FIG. 1. This reduces noise effect, but also precludes effective detail enhancement in most images.

In more sophisticated approaches, Lee and Park (Ref. [4]) suggest using a modified Laplacian in the UM scheme. They propose the order statistic (OS) Laplacian; its output is proportional to the difference between the local average and the median of the pixel in a window. They demonstrate that the resulting filter introduces a much smaller noise amplification than the conventional UM filter, with comparable edge-enhancement characteristics. A different approach is taken in Ref. [5]; in fact they replace the Laplacian filter with a very simple operator based on a generalization of the so-called Teager's algorithm. An example of such an operator is the simple quadratic filter given by $$z(n)=x^2(n)-x(n-1)x(n+1).$$

It can be shown that this operator approximates the behavior of a local mean-weighted high-pass filter, having reduced high-frequency gain in dark images areas. According to Weber's law (Ref. [1]), the sensitivity of the human visual system is higher in dark areas; hence, the proposed filter yields a smaller output in darker areas and, therefore, reduce the perceivable noise. Even though the above quadratic operators do take into account Weber's law, their direct use in unsharp masking may still introduce some visible noise depending on the enhancement factor (1 in FIG. 1) chosen.

In order to improve the performance of the UM, in Ref. [6], the output of the high-pass filter is multiplied by a control signal obtained from a quadratic edge sensors:

$$z(n)=[x(n-1)-x(n+1)]^2[2x(n)-x(n-1)-x(n+1)] \quad (1.1)$$

Its purpose is to amplify only local luminance changes due to true image details. The first factor on the right-hand side of Eq. 1.1 is the edge sensor. It is clear that the output of this factor will be large only if the difference between $x(n-1)$ and $x(n+1)$ is large enough, while the squaring operation prevents interpreting small luminance variations due to noise as true image details. The output of the edge sensor acts as a weight for the signal coming from the second factor in Eq. 1.1, which is a simple linear high-pass filter.

Another nonlinear filter, the Rational UM technique, has been devised (Ref. [7]): the output of the high-pass filter is multiplied by a rational function of the local input data:

$$z(n) = \frac{[x(n-1)-x(n+1)]^2}{k[x(n-1)-x(n+1)]^4+h}[2x(n)-x(n-1)-x(n+1)].$$

In this way, details having low and medium sharpness are enhanced; on the other hand, noise amplification is very limited and steep edges, which do not need further emphasis, remain almost unaffected. Under a computational viewpoint, this operator maintains almost the same simplicity as the original linear UM method.

A similar approach is also proposed in Ref. [8]; the method is similar to the conventional unsharp masking structure, however, the enhancement is allowed only in the direction of maximal change and the enhancement parameter is computed as a rational function like to the one described in Ref. [7]. The operator enhances the true details, limits the overshoot near sharp edges and attenuates noise in at areas. Moreover, it is applied to color image enhancement by using an extension of the gradient to multi-valued signal. Finally, in Ref. [9], the unsharp masking technique is extended with an advanced adaptive control that uses the local image content. More precisely, they have concentrated on the following properties for adaptive control of the sharpness enhancement:

local intensity level and related noise visibility;

noise level contained by the signal;

local sharpness of the input signal;

aliasing prevention, where alias results from nonlinear processing such as clipping.

These four properties of the video signal are analyzed locally by separate units and the amount of the sharpness enhancement depending on this analysis.

All the proposed contrast enhancement methods have been designed for the enhancement of 2-D data and cannot be applied to video sequences. In fact, they introduce many small artifacts and non-homogeneities which are perfectly acceptable in a still picture but become very visible and annoying in an image sequence. Moreover, conventional 2-D techniques cannot be applied to the enhancement of block-coded image sequences, because they emphasize such artifacts that become very visible. The local spectra and bandwidth of both noise and the signal vary spatially, and the characteristics of the filters need to be locally adapted.

SUMMARY OF THE INVENTION

It is, inter alia, an object of the invention to provide an improved sharpness enhancement. To this end, the invention provides a method and device for sharpness enhancement.

In a method of sharpness enhancement according to the invention, an input signal is filtered to obtain a filtered signal, the filtered signal is multiplied by a controllable fraction to obtain multiplied signals, and the multiplied signals are added to the input signal. According to the invention, the controllable fraction is generated by a non-linear function.

These and other aspects of the invention will be apparent from and elucidated with reference to the embodiments described hereinafter.

DESCRIPTION OF THE PREFERRED EMBODIMENTS

In this description, we propose a sharpness enhancement technique for video applications, taking into account the fact that the images can be blocked. The enhancement is accomplished by adding a correction signal to the luminance edges in an Unsharp Masking-like way. However, a nonlinear function is used to generate such a correction signal, and both spatial and temporal information is used to deal with significant but thin details and with blocking artifacts; at the same time, a temporal component of the operator reduces the noise amplitude.

This description is organized as follows. In Sections 2 and 3, a detailed description of the new method for video and block-coded image sequences is presented. In Section 4, an algorithm is described for the automatic discrimination between video and block-coded image, and an operator is proposed that can be applied for both type of sequences. In Section 5, conclusions are given.

Basically, the enhancement is accomplished by adding overshoot to luminance edges in an Unsharp Masking-like way. However, the optimal amount of overshoot added for a high image quality depends on the local image statistics. Controls are introduced, to improve the performances and to adapt it to moving sequences with different characteristics. Both spatial and temporal information is also used to enhance details, avoiding blocking artifacts and noise.

2. 3-D Unsharp Masking Technique for Video Image Sequences

The aim of a contrast enhancement technique is often to emphasize the details of a scene so as to make them more visible to a human viewer. Basically, the enhancement is accomplished by increasing the steepness of the significant luminance transitions, possibly also adding an overshoot to the edges around objects in the image.

In this section, an Unsharp Masking-based approach is presented for edge enhancing for TV application. The proposed scheme enhances the true details, limits the overshoot near sharp edges, and attenuates the temporal artifacts. More precisely, to try and cope with the problems of linear unsharp masking (noise sensitivity and excessive overshoot on sharp details), this technique has been extended with an adaptive control that uses the local spatio-temporal image content.

Figure 3:
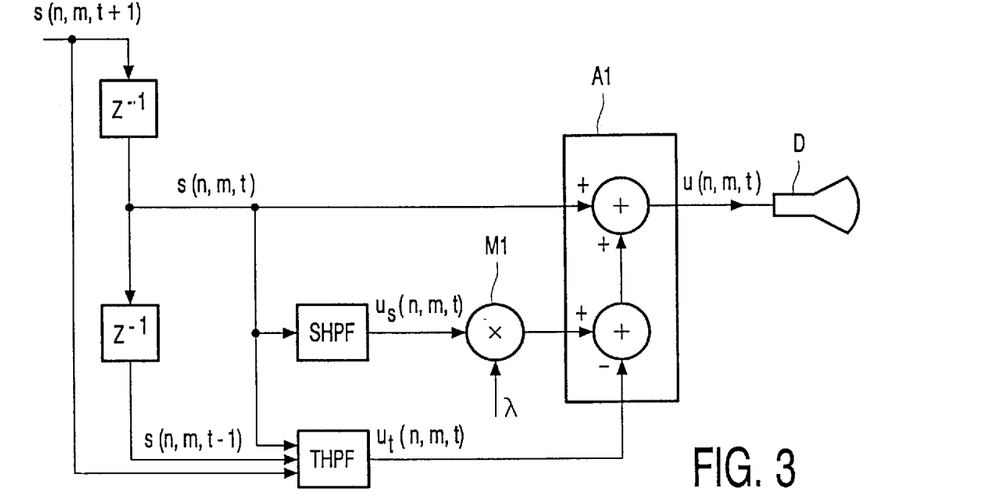
FIG. 3 shows a block diagram of an embodiment of a 3-D unsharp masking method.

The block diagram of the proposed algorithm is depicted in FIG. 3. Let $s(n, m, t+1)$ be the input signal; the enhanced signal $u(n, m, t)$ results from the contribution of three terms:

$$u(n,m,t)=s(n,m,t)+\lambda u_s(n,m,t)-u_t(n,m,t) \quad (2.1)$$

where $u_s(n, m, t)$ is the output signal of a spatial non-linear high-pass filter SHPF that introduces an emphasis which makes the signal variations more sharp, without incurring significant noise amplification and temporal artifacts. $u_t(n, m, t)$ is the output of a temporal high-pass filter THPF operating on three frames $s(n, m, t+1)$, $s(n, m, t)$, $s(n, m, t-1)$, that suppresses noise meanwhile preserving the sharpness of moving objects. Delay lines $Z^{-1}$ are present to generate $s(n, m, t)$ and $s(n, m, t-1)$ from $s(n, m, t+1)$. Multiplier M1 multiplies the output signal $u_s(n, m, t)$ of a spatial non-linear high-pass filter SHPF by the factor $\lambda$. Adder A1 adds the output signal of the multiplier M1 to the once-delayed input signal $s(n, m, t)$. The output signal $u(n, m, t)$ is displayed on a display device D.

The effect of the spatial and the temporal control functions on the image quality is explained in Sections 2.1 and 2.1.2, respectively.

2.1 Spatial Operator

The proposed algorithm is formed by a set of directional high-pass filters, followed by nonlinear correlation filters. In particular, we consider the separate effects of the control signal along the horizontal and the vertical direction: this choice, apart from being simple, is also justified by the fact that the eye is more sensitive to the lines and edges having these orientations (Ref. [1]).

Figure 4:
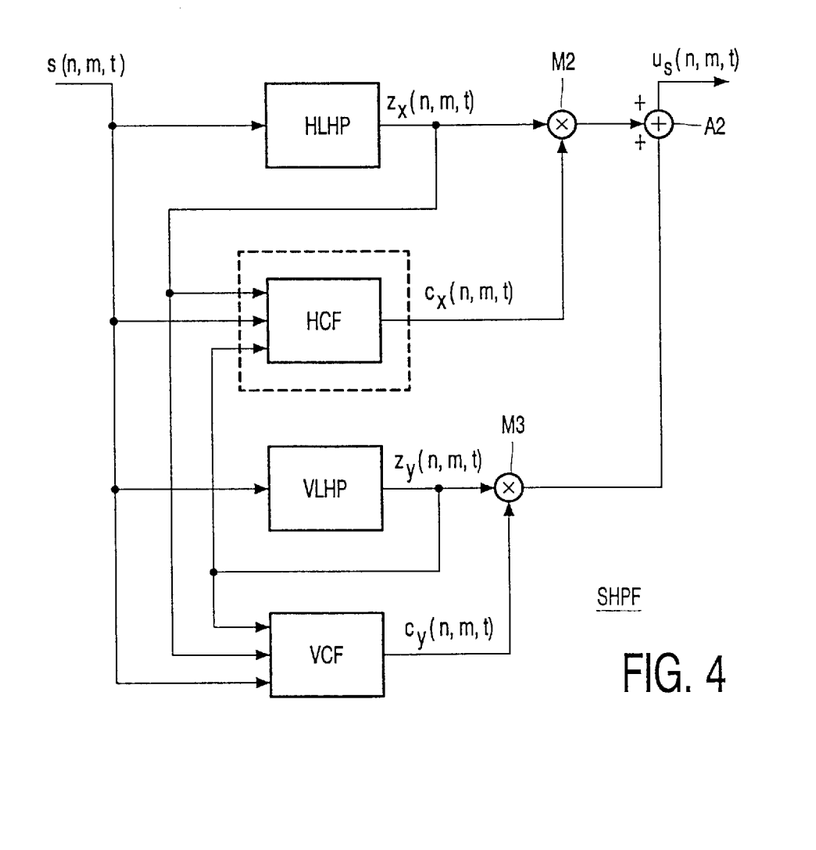
FIG. 4 shows a block diagram of an embodiment of a spatial filter for use in the embodiment of FIG. 3.

The block diagram of the spatial high-pass filter SHPF is depicted in FIG. 4, and its expression is:

$$u_s(n,m,t)=z_x(n,m,t)c_x(n,m,t)+z_y(n,m,t)c_y(n,m,t) \quad (2:2)$$

where $$z_x(n,m,t)=2s(n,m,t)-s(n,m-1,t)-s(n,m+1,t) \quad (2.3)$$

$$z_y(n,m,t)=2s(n,m,t)-s(n-1,m,t)-s(n+1,m,t)$$

respectively, are the outputs of respective Laplacian filters (horizontal and vertical linear high-pass filters HLHPF and VLHPF) applied horizontally and vertically to the input image. Their amplitude response is a monotone function of the frequency and is used to introduce the required emphasis on the signal variation.

In order to improve the performance of the high-pass filter we need to condition its operation so as to emphasize only the medium-contrast details. To achieve this purpose, $z_x$ and $z_y$ are multiplied by the control functions $c_x$ and $c_y$ that depend on the local gradient of the data. The control functions $c_x$ and $c_y$ are obtained by respective horizontal and vertical control functions blocks HCF and VCF that each receive the input signal $s(n, m, t)$ of the spatial high-pass filter SHPF, $z_x$ and $z_y$. Multiplier M2 multiplies the output signal $z_x(n, m, t)$ of the horizontal linear high-pass filter HLHP by the output $c_x(n, m, t)$ of the horizontal control function HCF. Multiplier M3 multiplies the output signal $z_y(n, m, t)$ of the vertical linear high-pass filter VLHP by the output $c_y(n, m, t)$ of the vertical control function VCF. Adder A2 sums the outputs of the multipliers M2, M3 to obtain the output signal $u_s(n, m, t)$ of the spatial high-pass filter SHPF.

For the sake of simplicity, the operation of the method is explained referring only to the x-direction.

2.1.1 Horizontal Control Function

Figure 5:
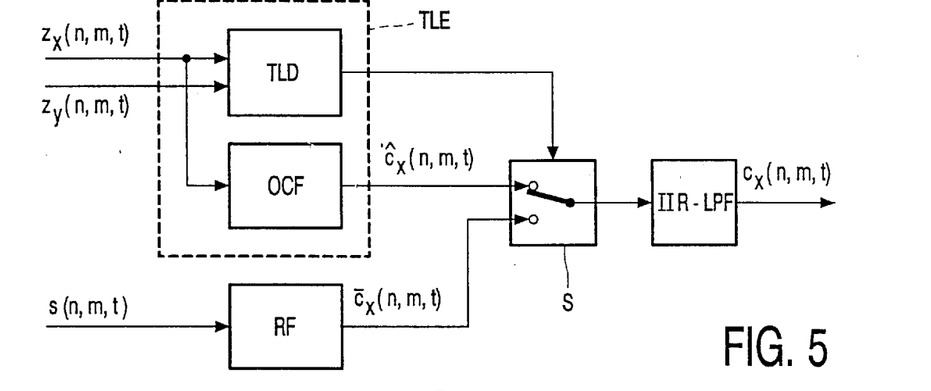
FIG. 5 shows a block diagram of an embodiment of a control function for use in the spatial filter of FIG. 3.

The control function is a nonlinear control that uses the local image content to avoid noise amplification, overshoot near sharp edges and temporal artifacts. To better understand its behavior, the output of the control function is shown in FIG. 5, which shows the part of the block diagram enclosed in the dashed box in FIG. 4.

The control function consists of three major functional blocks:
- a non-linear rational controlling function RF for the sharpening term;
- a specialized control TLE for the enhancement of thin lines;
- an IIR low-pass filtering IIR-LPF of the controlling function.

In the following, the effect of these controls on the image quality will be briefly explained.

Rational Function RF

The controlling function used is a rational function:

$$\overline{c}_x(n, m, t) = \begin{cases} 1 & \text{if } d_1 \leq d_x \leq d_2 \\ \dfrac{(d_1^2 + d_2^2)d_x^2(n, m, t)}{d_x^4(n, m, t) + d_1^2 d_2^2} & \text{if } d_x < d_1, d_x > d_2 \end{cases} \quad (2.4)$$

The value this function assumes depends on an edge sensor:

$$d_x(n,m,t)=s(n,m-1,t)-s(n,m+1,t) \quad (2.5)$$

It is a band-pass filter that discriminates between signal and noise. To this purpose, two implicit hypotheses are made on the significant image details: first, that they are represented by local gradient values which are larger than those introduced by noise; second, that they contribute to the data spectrum mainly in its mid-frequency range. Therefore, this function tends to privilege high-gradient areas and it is less sensitive to slow signal variations. Moreover, this mechanism makes the proposed operator less sensitive to the Gaussian-distributed noise that is always present in the data.

Figure 6:
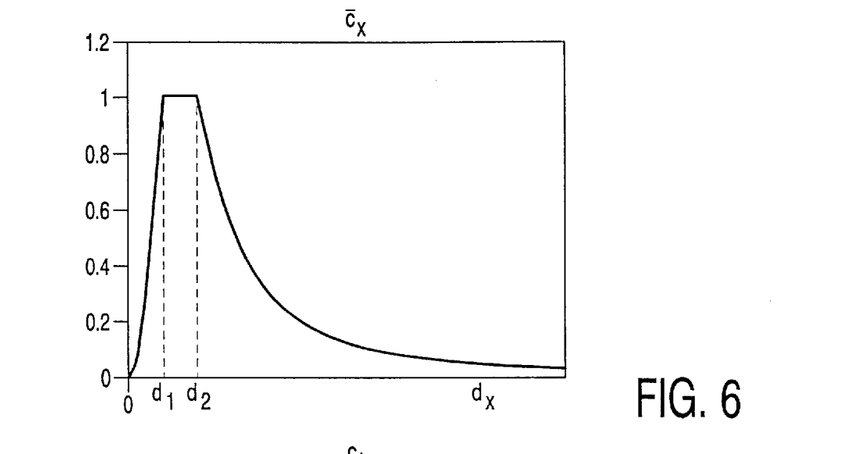
FIG. 6 shows a plot of a rational function.

To better understand its behavior, FIG. 6 shows the non-linear control term $\bar{c}_x$ as a function of $d_x$ for a specific choice of $d_1$ and $d_2$. The main characteristics of the rational function $\bar{c}_x$ are:

1. $\bar{c}_x=1$ for $d_1 \leq d_x \leq d_2$: this characteristic makes the operator able to emphasize details that are represented by the low and medium amplitude luminance transitions;
2. $\bar{c}_x \to 0$ for $d_x \to 0$: in homogeneous areas, where the noise is usually more visible, impulsive noise yields small value of $d_x$ (smaller than $d_1$), and then a small value of the added high-pass signal;
3. $\bar{c}_x \to 0$ for $d_x \to \infty$: in this way, undesired overshoots near sharp edges are avoided. In fact, sharp edges will yield high values of $d_x$ (larger than $d_2$) and $\bar{c}_x$ will be small.

The best balance among these effects can be achieved by setting the right positions for $d_1$ and $d_2$. The intensity of the enhancement can be obviously adjusted by changing the value of 1.

Controlling the Enhancement of Thin Lines TLE

Even though experimental results support the validity of the rational function $\bar{c}_x$, it cannot be used to emphasize thin lines. In fact, to reduce the noise sensitivity, the edge sensor is a bandpass filter and is not able to detect lines having a thickness of one pixel. Therefore, thin lines are erroneously interpreted as noise and this drawback causes some artifacts.

For example, when noisy pixels are adjacent to the line itself, the output of the sensor varies along the line. Hence, even for low-amplitude noise, the contribution of the correction term $c_x z_x$ may strongly vary because of the high slope of the control function near the origin combined with the very high value of the Laplacian. Temporal changes of the noise samples give rise to a non-uniform enhancement, appearing as an annoying flicker effect close to the line.

Thin lines are emphasized in a non-homogeneous way. Moreover, the enhancement in the first frame (left) is different from that one in the second frame (right), and introduce a temporal artifact which is very visible and annoying in an image sequence. Many small artifacts and non-homogeneities are introduced also near lines having slope close to, but different from, 0 or 90 degrees. In fact, in digital images, these lines unavoidably show jagged borders (staircase effect). In particular, one-pixel-wide lines are formed by segments whose width alternates between one and two. The rational function, due to its insensitivity to very thin lines, enhances these lines in a non-homogeneous way, and the staircase effect is therefore emphasized.

In order to overcome such problems, a simple but effective method is to include a proper control to detect thin lines. To this purpose, the outputs $z_x$ and $z_y$ of the Laplacian filters themselves are exploited. In correspondence of a very thin line, the following three cases are possible:

horizontal line: $|z_x| \approx 0$ and $|z_y| >> 0$ (2.6)

vertical line: $|z_x| >> 0$ and $|z_y| \approx 0$ (2.7)

diagonal line: $|z_x| >> 0$ and $|z_y| >> 0$ (2.8)

From these relationships, it is straightforward to discriminate between a pixel belonging to a line and a noisy pixel,
simply by setting a threshold $S_n$ which can be derived from statistical considerations, as it will be shown in the following. For example, when $$|z_x| \geq S_n \text{ and } |z_y| \leq S_n,$$

a vertical line is detected and it is only needed to limit the overshoot when such a line is already well visible. Therefore, once a thin line is detected by thin line detector TLD, the rational function $\bar{c}_x$ is replaced by following overpeaking controlling function OCF (see FIG. 5) by means of a switch S that is controlled by the output signal of thin line detector TLD:

$$\hat{c}_x = \begin{cases} 1 & \text{if} |z_x| < d_2 \\ \dfrac{d_0}{|z_x|} & \text{if} |z_x| \geq d_2 \end{cases}$$

which simply limits the correction term $z_x$ when its value is larger than $d_2$.

The extension to cases (2.7) and (2.8) is similar. In fact, when the condition (2.7) is true, a horizontal line is detected and the vertical rational function $\hat{c}_x$ is replaced by $\hat{c}_y$. Finally, if condition (2.8) is verified, both $\bar{c}_x$ and $\bar{c}_y$ are replaced by $\hat{c}_x$ and $\hat{c}_y$, respectively.

$S_n$ is chosen to discriminate between a pixel belonging to a line and a noisy pixel. The value of $S_n$ cannot be too small because many noise pixels would be erroneously interpreted as thin lines; on the other hand, $S_n$ cannot be too high, otherwise the thin line would not be individualized.

A good solution is to determine the relationship between $S_n$ and the noise variance present in the image. For this purpose, the probability of erroneously labeling a noise pixel as important detail is estimated. Supposing a sequence of images degraded with a zero mean Gaussian noise having variance $\sigma^2$, the probability error is estimated only when noise is present.

Because $\{s(n+k,m)|k=-1,0,1\}$ and $\{s(n,m+k)|k=-1,0,1\}$ are uncorrelated Gaussian random variables with mean zero and variance $\sigma^2(N(0,\sigma^2))$, it is easy to show that z and z are Gaussian random variables, with mean zero and variance $\sigma_{z_x}^2 = \sigma_{z_y}^2 = 6\sigma^2$.

Since $z_x$ and $z_y$ depend on the value of $s(n, m)$ (Eq.2.3), they are v.a. correlated. Hence, the joint probability density function is:

$$\begin{cases} f_{Z_x,Z_y}(z_x, z_y) = \dfrac{1}{2\pi\sigma_{zy}\sqrt{1-\rho^2}} e^{-Q} \\ Q = \dfrac{1}{2(1-\rho^2)}\left[\left(\dfrac{z_x}{\sigma_{zx}}\right)^2 + \left(\dfrac{z_y}{\sigma_{zy}}\right)^2 - 2\rho\dfrac{z_x}{\sigma_{zx}}\dfrac{z_y}{\sigma_{zy}}\right] \end{cases} \text{where}$$

$$\rho = \dfrac{COV[Z_x Z_y]}{\sigma_{zx}\sigma_{zy}}$$

Since $Z_x, Z_y \approx (0, 6\sigma)$ $$\rho = \dfrac{E[Z_x Z_y] - E[Z_x]E[Z_y]}{6\sigma^2} = \dfrac{4E[s(n,m)^2]}{6\sigma^2} = \dfrac{4\sigma^2}{6\sigma^2} = \dfrac{2}{3},$$

and the probability of error is:

$$P_e = 1 - P(|Z_x|\langle S_n, e|Z_y|\langle S_n)$$

$$= 1 - \frac{1}{4\sqrt{5}\pi\sigma^2} \int_{-S_n}^{S_n} e^{-\frac{3}{20\sigma^2}[z_x^2 + z_y^2 - \frac{4}{3}z_x z_y]} d_{zx} d_{zy}$$

By selecting $S_n = 3\sigma_{zx} = 3\sqrt{6}\sigma$, we obtain $$P_e \cong 1 - 0.995 = 0.005 = \frac{1}{200}$$

This means that in a 720×576 image, for example, more than 2000 noise points are amplified. However, most of these errors will not be perceived thanks to the masking effect of the details and of motion. Experimental results have shown that $S_n = 3\sigma_{zx} = 3\sqrt{6}\sigma$ is a satisfying threshold value.

It should be noted that this method can be applied only if the noise variance $\sigma^2$ is known, but it is not easy to estimate. However, the annoying flicker effects close to the line and staircase effect are visible above all in those parts of a sequence that are almost stationary. In this case, is easy to estimate the noise variance (Ref. [10]). The simplest method to estimate $\sigma^2$ is frame averaging, which is very effective when the image does not change from frame to frame but the degradation does. The simplest and most common form of frame averaging is estimating an image f(n, m) from a sequence of N degraded image frame $g_i$(n, m) for $1 \leq i \leq N$.

Suppose a sequence of degraded images $g_i$(n, m) can be expressed as $$g_i(n,m) = f(n,m) + \eta_i(n,m), \quad 1 \leq i \leq N \tag{2.9}$$

where $n_i$(n, m) is zero-mean stationary white Gaussian noise with variance of $\sigma^2$ and $n_i$(n, m) is independent from $n_j$(n, m) for $i \neq j$. If we assume that f(n, m) is non-random, the maximum likelihood (ML) estimate of f(n, m) that maximize $$P_{gi(n,m)|f(n,m)}(g_i^1(n,m)|f^1(n,m))$$

is given by $$\hat{f}(n,m) = \frac{1}{N} \sum_{i=1}^{N} g_i(n,m) \tag{2.10}$$

From (2.9) and (2.10), $$\hat{f}(n,m) = f(n,m) + \frac{1}{N} \sum_{i=1}^{N} \eta_i(n,m) \tag{2.11}$$

From (2.11), the degradation in the frame-averaged image remains a zero-mean stationary white Gaussian noise with variance of $\sigma^2/N$, which represents a reduction of noise variance by a factor of N in comparison with $\eta_i$(n,m)

This suggests estimating $\eta_i$ from $g_i - \hat{f}$. The value of N must be high in order to obtain an image $\hat{f}$(n,m) with a small noise variance. It cannot be too much high, because the estimate of would be wrong on sequences that are almost stationary.

Supposing to apply the enhancement operator on sequences with a maximum value of $\sigma^2 = 30$, we choose N=5. The estimate of $\sigma^2$ will be wrong in conditions of fast motion, but in this case the artifacts are less visible.

IIR Low-Pass Filtering

From FIG. 5, it should be noted that the final value of the horizontal control function $c_x$ is obtained by a spatial low-pass filtering, for the reasons that will be explained in the following.

Formally, its expression is:

$$c_x(n,m,t) = \frac{1}{2}[c_x(n-1,m,t) + c_x'(n,m,t)] \tag{2.12}$$

where $c_x'$ coincides with $\hat{c}_x$ or $\bar{c}_x$, depending on whether a thin line is detected or not.

A non-uniform enhancement effect is present in highly detailed areas with complex and fine contours, still due to small changes in the output of the sensor amplified by the slope of the rational function, together with the high value of the Laplacian in such areas. This effect is usually not perceived in 2-D enhancement, thanks to the masking effect of the details themselves; however, it generates a flickering which is very annoying in those parts of a sequence which are almost stationary. The sharpening is effective, but the edges are amplified in a non-homogeneous way.

To make the operator more robust against the appearance of false details, $c_x$ is IIR filtered as is shown in Eqs. (2.12): the values assumed by on $c_x$ neighboring pixels are computed by averaging the current value with the previous one along the direction which is orthogonal to the control action. In such a way, it is possible to reduce the discontinuity of these values mainly along the direction of the local borders, avoiding the generation of false details and the related visible artifacts.

It should be noted that an order of the low-pass filter more than two may generate artifacts because, in this case, pixels could be mediated that don't belong to the same object.

2.1.2 Temporal Operator

In video sequences, temporal correlation can be exploited to further reduce the noise. To suppress noise while preserving the sharpness of moving objects, we propose a temporal filter working on three frames. The basic assumption is that when a noisy pixel occurs the probability it occurs also in the previous or the next frame in the same spatial position is very small.

Figure 7:
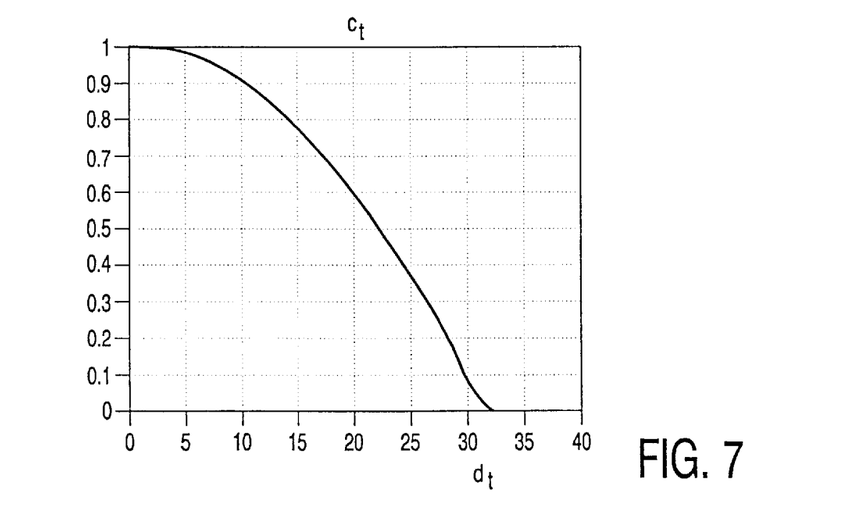
FIG. 7 shows a plot of a temporal controlling function.

Let us define the value of s in three subsequent frames as s(n,m,t-1), s(n,m,t) and s(n,m,t+1). When the following conditions $$s(n,m,t-1) \approx s(n,m,t+1) \tag{2.13}$$

$$s(n,m,t) - s(n,m,t-1) \neq 0 \tag{2.14}$$

are both verified, probably a noisy pixel is present in a locally static area. The proposed temporal filter is able to evaluate the conditions (2.13) and (2.14) and at the same time to perform low-pass filtering. Such a filtering is achieved by subtracting, from the input signal, the following high-pass signal:

$$u_t(n,m,t) = \frac{1}{4} z_t(n,m,t) c_t(n,m,t), \tag{2.15}$$

where $z_t$ a temporal Laplacian filter:

$$z_t(n,m,t) = 2s(n,m,t) - s(n,m,t-1) - s(n,m,t+1), \tag{2.16}$$

and $c_t$ controlling function:

$$c_t(n, m, t) = \begin{cases} \dfrac{d_0^2 - d_t^2(n, m, t)}{d_0^2} & \text{if } |d_t(\cdot)| \le d_0 \\ 0 & \text{if } |d_t^2(\cdot)|) d_0 \end{cases} \quad (2.17)$$

Its shape is shown in FIG. 7; it can be seen that $c_t \ge 0$ for $|d_t| \le d_0$; therefore, the temporal low-pass filter attenuates signal variations which are smaller than a certain threshold. This allows us to smooth selectively the signal variations which are attributed to noise corruption.

The temporal sensor $d_t$ is chosen to discriminate between a noisy pixel and a detail. It must be a simple function which is able to evaluate the conditions (2.13) and (2.14). To this purpose, the bandpass filter $d_t = s(n,m,t-1) - s(n,m,t+1)$ gives acceptable results with an extremely low computational complexity. As an example, let us consider the case of $s(n, m, t)$ corrupted by the noise, no motion, and presence of an uniform area in the masks, so that the spatial part of the filter is not allowed to operate: the values of $d_x$, $d_y$ and $d_t$ will be small, so that $c_x \cong c_y \cong 0$ and $c_t = 1$.

Hence, from Eq. (2.1), the output of the filter becomes:

$$u(n, m, t) \cong \frac{s(n, m, t) + s(n, m, t-1) + s(n, m, t+1)}{4}$$

which corresponds to a linear low-pass filter that reduces the noise. On the contrary, in correspondence of a local movement $d_t \gg 0$, so that $c_t \cong 0$ and no filtering is performed.

It should be noted, however, that this version of the filter may generate artifacts in particular conditions of fast motions. Let us consider, for example, the case of an object moving quickly on a uniform background: if the object is present in the filter mask at time t, but not at times t-1 and t+1, the value of $s(n, m, t)$ is considered as impulse noise by the temporal part of the filter, and the object may be deleted. In an example, a disk with white and black slices rotates with such a frequency to satisfy conditions (2.13) and (2.14). Applying the temporal operator with the bandpass sensor, some artifacts are introduced, which are visible as light and dark thin lines. If a larger computational load can be accepted, this type of artifact is eliminated by resorting to a Range Filter (Ref. [11]). Experimental results show that the noise reduction is the same with both operators. Therefore, the expression of $d_t$ becomes:

$d_t(n,m,t) = d_{max} - d_{min}$ $d_{max} = \max\{s(n,m,t-k)|k=-1,0,1\}$ $d_{min} = \min\{s(n,m,t-k)|k=-1,0,1\}$ Simulations show that the processed image presents sharper edges which make it more pleasant to the human eye. Moreover, the amount of the noise in the image and the temporal artifacts are clearly reduced.

2.2 Computational Complexity Analysis

Now, we analyze the computational complexity of our proposed algorithm. From FIG. 4, it can be seen that the operator is separable, therefore, we consider the separate effect of the spatial and temporal operator. The operator needs 19 multiplications and 13 sums. However, it has to be noted that the values of the non-linear functions $c_x$, $c_y$ and $c_t$, depend on the value of the edge sensors ($d_x$, $d_y$ and $d_t$) which assume only 255 different values. Hence, the rational functions can be calculated by using a look-up table; in this case, the number of multiplications per pixel becomes 7 instead of 19. Hence, under a computational viewpoint, it must be stressed that the proposed solution gives acceptable results with an extremely low computational complexity.

3. Unsharp Masking Technique for Block-Coded Image Sequences 3.1 Introduction

Most video data compression standards use a block-based motion estimate and block-based discrete cosine transform (DCT). In particular, they use an N×N pixel-block DCT for information packing into a few transform coefficients. This block-based DCT scheme takes advantage of the local spatial correlation property of images. However, this type of coding induces the well-known blocking artifacts, corner outliers, and ringing noise when the image is highly compressed.

Conventional 2-D techniques for contrast sharpening cannot be applied to the enhancement of block-coded image sequences, because they emphasize such artifacts that become very visible and annoying in an image sequence. The local spectra and bandwidth of both the noise and the signal vary spatially, and the characteristics of the filters need to be locally adapted.

For this purpose, in this section, we first present a comprehensive characterization of the coding artifacts which are introduced into reconstructed video sequences through the use of the video coding algorithm and then propose a simple modification to the algorithm described in the previous chapter in order to emphasize the details and reduces the visibility of the most typical coding artifacts.

3.2. Video Coding Distortions

The following discussion will be limited to descriptions of the artifacts' visual manifestations, causes and relationships. We also describe the spatial and temporal characteristics of video sequences that are susceptible to each artifact and in which the artifacts are visually prominent.

3.2.1 Blocking Effect

The blocking effect is an annoying side result of techniques in which blocks of pixel are treated as single entities and coded separately. In brief, due to the isolated nature in which individual blocks are coded, the level and characteristic of the coding error introduced into a block may differ from one block to another. So, a smooth change of luminance across a border can result in a step in the decoded image.

When we consider a smoothing operation to remove blocking artifacts in video coding, we find three interesting observations. First, the human visual system is more sensitive to blocking artifacts in at regions than in complex regions. Therefore, a strong smoothing filter is required on those regions. In complex regions, however, smoothing of few pixel around the block boundary is enough to achieve a desired de-blocking effect. Second, smoothing operations tend to introduce more undesirable blur in complex regions that in at regions. Hence, adaptive smoothing to preserve image details is desirable in complex regions. Third, because of motion compensation, blocking artifacts are propagated, and the propagated artifacts are more visible in at regions that in complex ones. Therefore, smoothing in these regions must cover the inside of a block as well as block boundaries.

3.2.2 Blurring

Blurring manifests as a loss of spatial detail and a reduction in sharpness of edges in moderate to high spatial activity regions of frames, such as in roughly textured areas or around scene object edges.

For intra-frame coded macroblocks, blurring is directly related to the suppressions of the higher-order DCT coefficients through coarse quantization, leaving only the lower-order coefficients to represent the contents of a block; therefore, blurring can be directly associated with low-pass filtering.

For predictive coded macroblocks, blurring is mainly a consequence of the use of a predicted macroblock with a lack of spatial detail. However, blurring can also be induced in bi-directionally predicted macroblocks, where the interpolation of the backward and forward predictions results in an averaging of the contents of the final bi-directional prediction. In both these cases, the blurred details are supplemented by the prediction error that supplies some higher-frequency information to the reconstruction, thereby reducing the blurring effect.

From the observations above, an adaptive enhancement filter is required in complex regions in order to emphasize the details and reduce the visibility of the coding artifacts.

3.2.3 Staircase Effect

The DCT basic images are not attuned to the representation of diagonal edges. Consequently, more of the higher activity basis images are required to satisfactory represent diagonal edges. Due to the typically low magnitude of the higher-order basic images, coarse quantization results in their truncation to zero. The contribution originally made by the higher-order basic images in forming the diagonal edge is diminished, resulting in a reconstruction exhibiting only the characteristics of the lower frequency basic images, which are generally either horizontally on vertically oriented. So, for a block containing a diagonal edge angled towards the horizontal, coarse quantization will result in a reconstruction with horizontal orientation, and vice versa for blocks angled towards the vertical. Note that the step-wise discontinuities occur at block boundaries.

3.2.4 Ringing

The ringing effect is related to the high-frequency distortions introduced by the DCT coefficient quantization. In fact, the representation of a block can be considered as a carefully balanced aggregate of each of the DCT basic images. Therefore, quantization of an individual coefficient results in the generation of an error in the contribution made by the corresponding basis image to a reconstructed block. Since the higher-frequency basic images play a significant role in the representation of an edge, the quantized reconstruction of the block will include high-frequency irregularities. This effect is most evident along high contrast edges in areas of generally smooth texture in the reconstruction.

3.2.5 False Edges

Because of motion compensation, blocking artifacts are propagated; hence, false edges are a consequence of the transfer on the block-edge discontinuities formed by the blocking effect into the current frame. As with the blocking effect, false edges are mainly visible in smooth areas of predictive coded frames. The prediction error in such areas would typically be minimal, or quantized to zero, and, therefore, the false edges would not be masked.

3.2.6 Motion-Compensation Mismatch

Motion-compensation (MC) mismatch can be generally defined as the situation in which a satisfactory prediction cannot be found for a particular macroblock, resulting in a prediction whose spatial characteristics is mismatched with those of the current macroblock. The consequence of such a situation is a high level of prediction error which result in a reconstruction with highly visible distortions that is, typically, a high-frequency noise-like effect.

3.3 Proposed Algorithm

Many de-blocking schemes have been proposed in still image coding, such as JPEG, under the assumption that blocking artifacts are always located at block boundaries. In video coding, however, the blocking artifacts of the previous frame can be propagated to the current frame, and can be located at any position in a block due to motion-compensated prediction (Sec. 3.2.5). Therefore, simple block boundary smoothing is not good enough to remove blocking artifacts appearing in video coding. Moreover, a low-pass effect is also needed inside the macroblock to reduce ringing and motion compensation mismatch effects. Iterative methods based on projection on a convex set (Refs. [12], [13]) may be a candidate algorithm. However, it is not adequate for real-time video coding due to its complexity.

In this section, we present an unsharp masking-based approach for noise smoothing and edge enhancing. The block diagram is similar to the one shown in FIG. 3 and FIG. 4, but it is necessary to modify the rational functions (Eq. 2.4) in order to enhance true details and reduce coding artifacts.

The new rational function $\bar{c}_{xb}$ and $\bar{c}_{yb}$) has to be simple and must obey several restrictions, in order to enhances true details and reduce noise:

1. It has to attenuate signal variations which are smaller that a certain threshold h. This will allow us to smooth selectively the signal variations which are attributed to coding artifacts;
2. The mid-range details which are the signal transitions having magnitude larger than h must be enhanced;
3. To avoid the excessive overshoot over sharp edges: $\lim_{\Delta \to \infty} \bar{c}_{xb}(\Delta) = 0$ A simple function verifying all these conditions can be formulated as a rational function that is the ratio of two polynomial functions:

$$\bar{c}_{xb}(n, m, t) = \begin{cases} \dfrac{\hat{d}_x(n, m, t)^2 - h'}{k\hat{d}_x(m., .t)^4 + 4\lambda h'} & \text{if } \dfrac{\hat{d}_x(n, m, t)^2 - h'}{k\hat{d}_x(n, m, t)^4 + 4\lambda h'} \leq 1 \\ 1 & \text{otherwise} \end{cases}$$

$$\bar{c}_{yb}(n, m, t) = \begin{cases} \dfrac{\hat{d}_y(n, m, t)^2 - h'}{k\hat{d}_y(m., .t)^4 + 4\lambda h'} & \text{if } \dfrac{\hat{d}_y(n, m, t)^2 - h'}{k\hat{d}_y(n, m, t)^4 + 4\lambda h'} \leq 1 \\ 1 & \text{otherwise} \end{cases}$$

where the edge sensors $\hat{d}_x$ and $\hat{d}_y$ are as:

$$\hat{d}_x(n, m, t) = d_x(n, m, t) \frac{\sigma^2}{\sigma^2 + \sigma_{th}^2} \quad (3.3)$$

$$\hat{d}_y(n, m, t) = d_y(n, m, t) \frac{\sigma^2}{\sigma^2 + \sigma_{th}^2}$$

Variance-based measurements proved to be a reliable and simple estimator of the degree of local activity (Ref. [14]) and have been used for this purpose also in the present work. Hence, $\sigma^2$ is the variance of the pixels belonging to a 3×3 window centered on the current pixel, and $\sigma_{th}^2$ is a value to be fixed based on the average variance of the image. The parameters k and h' are proper positive factors that are chosen to achieve the best trade-off between enhancement of details having low and medium sharpness, reduction of noise and overshoot near already sharp edges. The relations between the parameters $d_1$, $d_2$, k, h $$k = \frac{1}{d_1^2 + d_2^2}, \quad h' = \frac{d_1^2 d_2^2}{(d_1^2 + d_2^2)(4\lambda + 1)},$$

while with the parameter λ we can adjust the enhancement intensity.

Figure 8:
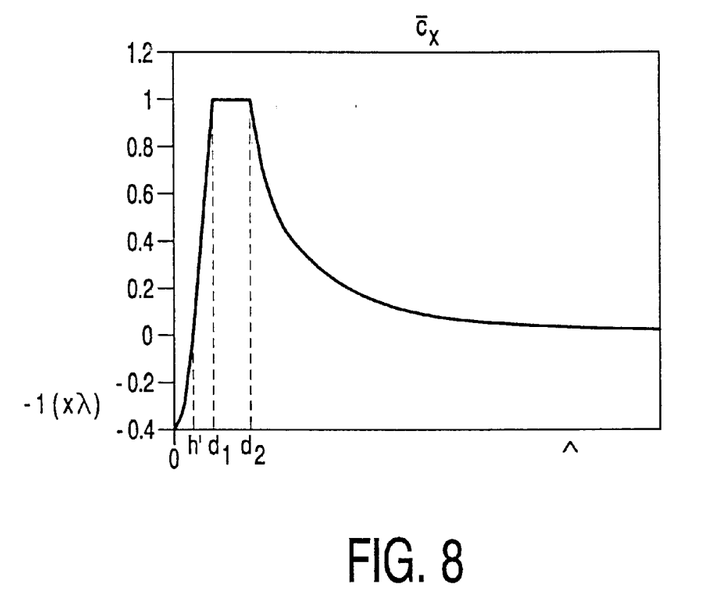
FIG. 8 shows a plot of a control function $c_{x,b}$.

FIG. 8 shows the shape of the horizontal rational control function. It can be seen that $\bar{c}_{xb} \leq 0$ for $d \leq h'$; therefore, it attenuates signal variations that are smaller than a certain threshold. To better understand the behavior of the filter, we describe the main characteristics in at and complex regions.

1. In uniform areas, $\sigma^2$ is negligible with respect to $\sigma_{th}^2$, so that $\hat{d}_x$ and $\hat{d}_y$ tend to zero and $\bar{c}_{xb} \cong \bar{c}_{yb} \leq 0$. Hence, the output of the spatial filter $s+\lambda[z_x\bar{c}_{xb}+z_y\bar{c}_{yb}]$ is a low-pass signal and the coding artifacts are reduced.

Figure 9:
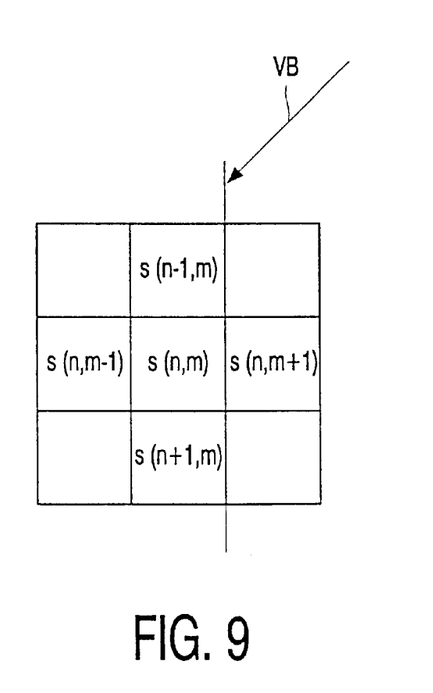
FIG. 9 shows a 3×3 window of a non-linear filter.

In particular, supposing that a vertical border occurs between uniform areas (blocking effect; see FIG. 9); $\sigma^2$ will be small and $\bar{c}_{xb} \cong -\frac{1}{4}\lambda$. Since we consider a vertical block boundary VB, the previous value of the control function $c_x(n-1,m)$ is similar to $\bar{c}_{xb}(n,m)$. Then, the output of the IIR filter coincides with $\bar{c}_{xb}(n,m)$:

$$c_x(n.m) = \frac{1}{2}[c_x(n-1,m) + \bar{c}_{x_b}(n,m)] \cong \bar{c}_{x_b}(n,m) \cong -\frac{1}{4\lambda}.$$

Moreover, considering that on such a border $z_y$ will be small too, the output of the filter only depends on the horizontal control function, and we obtain a horizontal linear low-pass filter:

$$u_s(n,m) \cong s(n, m(-\frac{1}{4}z_x(n,m))$$
$$\cong \frac{2s(n,m) + s(n-1,m) + s(n+1,m)}{4}$$

that reduces the discontinuities between the boundaries of adjacent blocks.

Our operator also reduces ringing noise. Ringing noise along a vertical edge is like that considered above; in fact, the value of $z_y$ is small and the output of the filter only depends on the horizontal control function. So, we obtain a horizontal low-pass filter.

As regards ringing noise around a diagonal edge, the value of $z_x$ and $z_y$ are not zero and the output of the filter depends on both the horizontal and vertical control functions:

$$u_s(n,m)=s(n,m)+\lambda[z_x(n,m)c_x(n,m)+z_y(n,m)c_y(n,m)]$$

Since $\sigma^2$ is negligible with respect to $\sigma_{th}^2$, the values of the rational functions are:

$$\bar{c}_{x_b} \cong \bar{c}_{y_b} \cong \frac{1}{4\lambda}$$

It has to be noted that the previous values of the conrol functions are greater than the current value:

$$c_x(n-1,m) > \bar{c}_{x_b}(n,m) \text{ and } c_y(n,m-1) > \bar{c}_{y_b}(n,m)$$

because they are closer to the edge. This means that the output of the IIR low-pass filter is greater than $-\frac{1}{4}\lambda$. Experimental results show that $$c_x(n,m) \cong \frac{1}{2}[c_x(n-1,m) + \bar{c}_{x_b}(n,m)] \cong -\frac{1}{6}\lambda$$

$$c_y(n,m) \cong \frac{1}{2}[c_y(n,m-1) + \bar{c}_{y_b}(n,m)] \cong -\frac{1}{6}\lambda$$

In this way, we obtain a 2-D linear low-pass filter; in fact, the expression of $u_a(n, m)$ is:

$$u_s(n,m) \cong \frac{2s(n,m) + s(n+1,m) + s(n-1,m) + s(n,m+1)}{6} + \frac{s(n-m-1)}{6}$$

2. In detail areas, $\sigma^2 >> 0$, and then $\hat{d}_x \cong d_x, \hat{d}_y \cong d_y$. Therefore, the mid-range details represented by the signal transitions having magnitude larger than h' will be enhanced. On the other hand, when $d_x \cong 0$ (or $d_y \cong 0$) and $\sigma^2 >> 0$, the area is uniform in the horizontal (vertical) direction, so that the low-pass filtering is applied.

If a smaller computational load is expected, we can calculate the variance of five pixels instead of nine pixels. So, if we define $\sigma^2$ like the variance of the following five pixels: s(n, m); s(n−1, m); s(n+1, m); s(n, m−1); s(n, m+1), we can use $\sigma_c^2$ in Eq.3.3.

3.4 Conclusions

From the observations above, the filter for at regions provides a smoothing effect inside a block as well as on block boundaries because in video coding the blocking and ringing artifacts can be located at any position in a block due to motion-compensated prediction.

On the other hand, the behavior of the filter is a nonlinear high-pass one in complex areas in order to enhances true details. The variance detector that regulates the filter behavior is embedded in the filter itself, which allows a compact expression of the operator.

It has to be noted that the operator for the enhancement in block-coded image sequences is similar to the one described in Section 2. This suggests defining an enhancement algorithm for both video and block-coded image sequences. For this purpose, a simple and effective solution is proposed in Section 4.

4. Automatic Discrimination Between Video and Block-Coding Image Sequences

In Section 2, we have described an enhancement technique for video image sequences that enhances the true details, limits the overshoot near sharp edges and attenuates the temporal artifacts. This operator cannot be applied to the enhancement of block-coded image sequences, because it emphasizes such coding artifacts that become very visible and annoying.

For this task, a simple modification has been introduced when processing block-coded image sequences in order to emphasize the details and reduce the visibility of blocking and ringing effects (see Section 3).

However, this operator cannot be applied in video sequences, because it introduces significant blurring and does not amplify the low-contrast details.

In order to define an enhancement technique for both video and coded image sequences, it is important to insert a mechanism in the operator that allows the behavior of the filter to change according to the presence of the coding artifacts. To this purpose, in this chapter we insert a weight factor in the expression of edge sensor that depends on a new distortion measure for blocking and ringing artifacts.

4.1 Enhancement Operator for Both Video and Coded Image

From a comparison of the enhancement techniques described in Sections 2 and 3, it can be seen that they defer for the rational function and the edge sensor. This suggests defining a rational function and/or an edge sensor for both video and block-coded image sequences. A simple and effective solution is the following:

$$\overline{c}_{x_n}(n,m) = \begin{cases} \frac{d_x^2(n,m)-h'}{kd_x^4(n,m)+4\lambda h'} f & \frac{d_x^2(n,m)-h'}{kd_x^4(n,m)+4\lambda h'} \leq 1 \\ 1 & \text{otherwise} \end{cases} \text{ where} \quad (4.1)$$

$$\hat{d}_x(n,m) = d_x(n,m) \frac{\sigma^2}{\sigma^2 + \beta \sigma_{th}^2} \quad (4.2)$$

where the parameter $\beta$ plays an important role in determining the bias of the filter (the criterion for the determination of this weight will be explained in the following). In particular, the value of $\beta$ change according to the presence of the coding artifacts, i.e., $\beta$ tends to zero in uncompressed video sequences, while increasing in block-coded sequences. In this way, the behavior of the filter becomes more and more low-pass as coding artifacts increases.

In video sequences, the constant $-h'$ in the numerator of $c_x$, introduces a low-pass effect aiming to reduce noise that is always present in a real image. Moreover, it has to be noted that in this case $\hat{d}_x \simeq d_x$, therefore, the filter does not introduce significant blurring near low-contrast details. As mentioned above, the value of $\beta$ depends on the presence of coding artifacts; therefore, in the following, we introduce a new distortion measure for blocking and ringing artifacts.

4.1.1 Distortion Measure for Blocking and Ringing Artifacts

In order to define a metric for blockiness, various methods have been proposed in literature (Refs. [15], [16], [17], [18]). All of the techniques described suppose that the blocking artifacts are always located at block boundaries, but in video coding, the blocking artifacts can be located at any position in a block due to motion-compensated prediction. Therefore, these methods are not good enough to measure the presence of blocking artifacts. A simple solution would be to apply these algorithms with different value of N; however, this approach is not adequate for real-time video coding due to its complexity. Moreover, these techniques do not take into account the ringing noise that is very visible and annoying in a image sequences.

We propose a method to evaluate the presence of both blocking and ringing artifacts that does not need information about the position and size of a block.

Detection of the Blocking Effect

Among the most typical artifacts that can be introduced by coding algorithms, the blocking effect is an annoying side result of techniques in which blocks of pixels are treated as single entities and coded separately (see Sec. 3.3.1). In this case, a smooth change of luminance across the border of a block can result in a step in the decoded image if neighboring samples fall into different quantization intervals.

Then, if the coefficients of two adjacent blocks are coarsely quantized, we expect to see two blocks of low variance and a difference in the intensity slope across the block boundary. On the other hand, this abrupt change in intensity slope across the block boundaries of the original unquantized image is rather unlikely.

From the above consideration, it is clear that an appropriate method to detect a blocking effect is to find two adjacent blocks with a very small variance value and a different mean value.

For the sake of simplicity, we consider the horizontal direction. Let s(n, m) be the luminance level of the pixel in position (n, m); we define $\mu_{1_x}, \sigma_1^2, \mu_{2_x}, \sigma_2^2$ as the mean and variance of two 3×3 adjacent windows:

$$\mu_{1_x} = \frac{\sum_{i=-1}^{i=1}\sum_{j=-1}^{j=1} s(n+i, m+j)}{9} \quad (4.4)$$

$$\sigma_{1_x}^2 = \frac{\sum_{i=-1}^{i=1}\sum_{j=-1}^{j=1} [s(n+i, m+j) - \mu_{1_x}]^2}{9}$$

$$\mu_{2_x} = \frac{\sum_{i=-1}^{i=1}\sum_{j=-1}^{j=1} s(n+i, m+3+j)}{9}$$

$$\sigma_{2_x}^2 = \frac{\sum_{i=-1}^{i=1}\sum_{j=-1}^{j=1} [s(n+i, m++3+j) - \mu_{2_x}]^2}{9} \quad (4.5)$$

When the following conditions:

$$\begin{cases} \sigma_{2_x}^2 + \sigma_{s_x}^2 \simeq 0 \\ |\mu_{1_x} - \mu_{2_x}| > 0 \end{cases} \quad (4.6)$$

are both verified, probably a blocking effect is present in a locally static area.

The extension to the vertical direction is trivial.

Detection of Ringing Noise

As mentioned in Sec. 3.2.4, the ringing noise is the Gibb's phenomenon due to truncation of the high-frequency coefficients by quantization, and, as such, it is most evident along high contrast edges in areas generally of smooth texture. It appears as a shimmering or rippling outwards from the edge up to the encompassing block's boundary.

From this consideration, a simple method in order to detect ringing noise is to find two adjacent 3×3 windows with a similar mean value (because the ringing noise has mean zero), but a very different variance value. As done earlier, we consider only the horizontal direction; let be $\mu_1, \sigma_1^2, \mu_2, \sigma_2^2$, the mean and variance of two adjacent windows (see Eq.4.4). When $$\begin{cases} \sigma_{1_x}^2 = 0 \\ \sigma_{2_x}^2 \gg 0 \\ |\mu_{1_x} - \mu_{2_x}| \simeq 0 \end{cases} \text{ or } \begin{cases} \sigma_{2_x}^2 = 0 \\ \sigma_{1_x}^2 \gg 0 \\ |\mu_{1_x} - \mu_{2_x}| \simeq 0 \end{cases} \quad (4.7)$$

are verified, probably a ringing noise is detected. The ringing noise is most visible as the bit-rate decrease.

4.1.2 Determination of $\beta$ Value

In order to define an enhancement technique for both video and block-coded image sequences, we have inserted a mechanism in the operator that allows the behavior of the filter to change according to the presence of the coding artifacts.

Equation 4.2 describes the approach that has been chosen in order to achieve this goal, where $\beta$ takes a zero value in uncompressed images, while increasing in block-coded images. In this way, the behavior of the filter ranges from a quasi-linear low-pass one in uniform area, to a strongly nonlinear high-pass one in detailed areas. Moreover, it becomes more and more low-pass as coding artifacts increases.

From the consideration in the previous section, it is clear that $\beta$ depends on the amount of the coding artifacts in the sequence. To this purpose, we will now show the relation between and the number of coding artifact detected, which-takes into account the size of the image and the number of the frame used for estimate β.

For the sake of simplicity, we define $UM_{video}$, $UM_{block}$ and $UM_{adapt}$, the methods described in Sections 2, 3 and the preceding part of Section 4, respectively. In order to detect blocking and ringing artifacts, the conditions (4.6) and (4.7) have to be verified. Experimental results show that the following thresholds $$\begin{cases} \sigma_{1_x}^2 + \sigma_{2_x}^2 = 0.5 \\ |\mu_{1_x} - \mu_{2_x}| > 5 \end{cases} \text{ for detection of blocking effects, and}$$

$$\begin{cases} |\sigma_{1_x}^2 - \sigma_{2_x}^2| > 25 \\ \sigma_{1_x}^2 + \sigma_{2_x}^2 = |\sigma_{1_x}^2 - \sigma_{2_x}^2| \text{ for detection of ringing noise} \\ |\mu_{1_x} - \mu_{2_x}| < 3 \end{cases}$$

are satisfactory.

In our experiments, we used image sequences after MPEG coding of the 576×720 frames at various bit-rate. Since the blocking effect is more visible in I frames than in B and P frames due to the motion compensation, the results take into account different frames.

$N_{bl}$ and $N_{ri}$ indicate how many pixels are interpreted as blocking effect and ringing noise, respectively. $N_{bl}=N_{ri}=0$ for uncompressed video sequences, while it increases in block-coded sequences as the bit-rate decreases. It should be noted that in some sequences, the ringing noise is more visible than the blocking effect.

From the above considerations, it is clear that β depends on the values of $N_{bl}$, and $N_{ri}$. Obviously, the number of coding artifacts also depends on the size of the image and the number of the frame considered; hence, let $N_c$ and $N_r$ be the width and the height of their image, and $N_f$ be the number of frame used to calculate $N_{bl}$ and $N_{ri}$, an appropriate measure for β is:

$$\beta = \alpha \frac{Nbl + Nri}{NcNrNf} \quad (5.1)$$

where α is a constant weight which can be derived from experimental results. In our experiment, $N_c=720$, $N_r=576$, $N_f=4$ and α=3000.

Our method detects both blocking and ringing artifacts and it does not need any information about the position and the size of the blocks. Moreover, β always take a zero value on uncompressed image; therefore, is very simple distinguish a coded image between a video one.

In order to further test the noise robustness of the proposed method, an original sequence has been corrupted using Gaussian-distributed noise of variance 50. If a prior art linear UM filtering (λ=0.5) is applied, the image is well sharpened, but the noise is amplified and it becomes so relevant to degrade the output scene. The best visual quality is obtained using the proposed $UM_{video}$ filtering structure (λ=1.2, $d_1$=30 and $d_2$=40); in fact the spatial operator (see Sec. 2.1) enhances the medium-contrast details and the temporal filter (see Sec. 2.1.2) reduces the noise.

A comparison of the enhancement between $UM_{video}$, $UM_{block}$ and $UM_{adapt}$ methods, yields the following results. Using the $UM_{video}$ operator, with λ=1, $d_1$=30 and $d_2$=40, the processed image is sharp and the noise is almost absent. The $UM_{block}$ method (λ=1, $d_1$=30, $d_2$=0, $\sigma_{th}^2$=400) shows an improvement of the quality inhomogeneous area; nevertheless, it introduces significant blurring. In fact, details of intermediate strength are not as well defined as in the previous case. Finally, applying the $UM_{adapt}$ method to the original image, it can be seen that the processed image is similar to that of $UM_{video}$. In fact, in this sequence, $N_{bl}=N_{ri}=0$ and β=0. Therefore, the low-pass effect of the filter is reduced and the low-contrast details are amplified. This means that $UM_{adapt}$ can be applied on both the video and compressed images.

The results on compressed image sequences are shown in the following. Applying a conventional linear UM operator (λ=0.5) to the coded and decoded image, the processed image is sharp, but the ringing effect is very visible in the uniform areas. The image restored by $UM_{block}$ operator (λ=1, $d_1$=30, $d_2$=40, $\sigma_{th}^2$=400) is free of ringing effect and the edges are enhanced. The image enhanced by $UM_{block}$ method is free of blocking artifacts. There is practically no blurring of the texture. Further, edges are amplified and the image is more sharp. Obviously, the same results are obtained with $UM_{adapt}$ operator, because in compressed images, β>>0. However, its effectiveness depends on the value of β. When β=0, λ=1, $d_1$=30, $d_1$=40 and $\sigma_{th}^2$=200, as expected, the sharpening is effective, especially for medium-contrast details. However, the coding artifacts are amplified in smooth areas. Using β=1, the homogeneous areas are less noisy than in the case of β=0. Nevertheless, a good sharpening is achieved in the detail areas. Finally, with β=4, it can be seen that coding artifacts are removed, but it introduces significant blurring.

From these considerations, it is clear that β cannot be a constant value, but it has to depend from the presence and the amount of the coding artifacts in the images. Equation 5.1 describes the approach that has been chosen in order to achieve this goal.

4.1.3 Observations

1. A major proposed algorithms to define a metric for blockiness suppose that the blocking artifacts are always located at block boundaries, but in video coding, the blocking artifacts can be located at any position due to the motion-compensated prediction. Our distortion measure does not need any information about the position and the size of the blocks and it also detects the ringing noise.

2. Under a computational viewpoint, it must be stressed that the proposed solution maintains almost the same simplicity as the method described in Section 3 for the enhancement on compressed sequences. In fact, in order to detect blocking and ringing artifacts we use the variance value which has already been estimated in the expression of the rational function (see Eq. 3.3).

Figure 10:
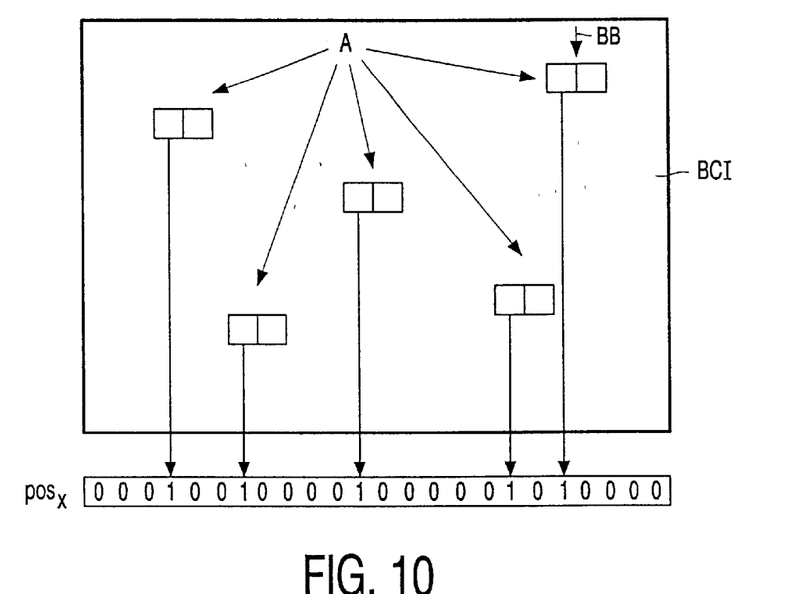
FIG. 10 shows a binary vector that indicates a position of coding artifacts.

3. If our method is applied to the I frames, it is possible to determine the size of a block; in fact, in these frames, the blocking and ringing artifacts are always located at block boundaries. A simple method is described in the following, where, for the sake of simplicity, we consider only the horizontal direction. First, we define a vector $pos_x$ of length $N_c$, where $N_c$ is the width of the image. When in a block-coded image BCI, a blocking or ringing artifact A is detected, the respective position of $pos_x$ is set to 1. In this way, a binary vector $pos_x$ is generated where a 1 value indicates the position of a coding artifact (see FIG. 10). Since the blocking and ringing artifacts A are located at block boundaries BB, $pos_x$ can be expressed as:

$$pos_x(n) \simeq \sum_{ii=1}^{Nc/B} \delta(n - kB)$$

where B is the size of the blocks. Then, the autocorrelation of $$R_x(n) = \sum_{i=1}^{Nc} pos_x(I) \cdot pos_x(i+n) \quad (4.8)$$

is maximum when n=kB. Therefore, in order to determine the size of the block we can simply calculate the position of the first maximum of $R_x$ and $R_y$.

Figure 11:
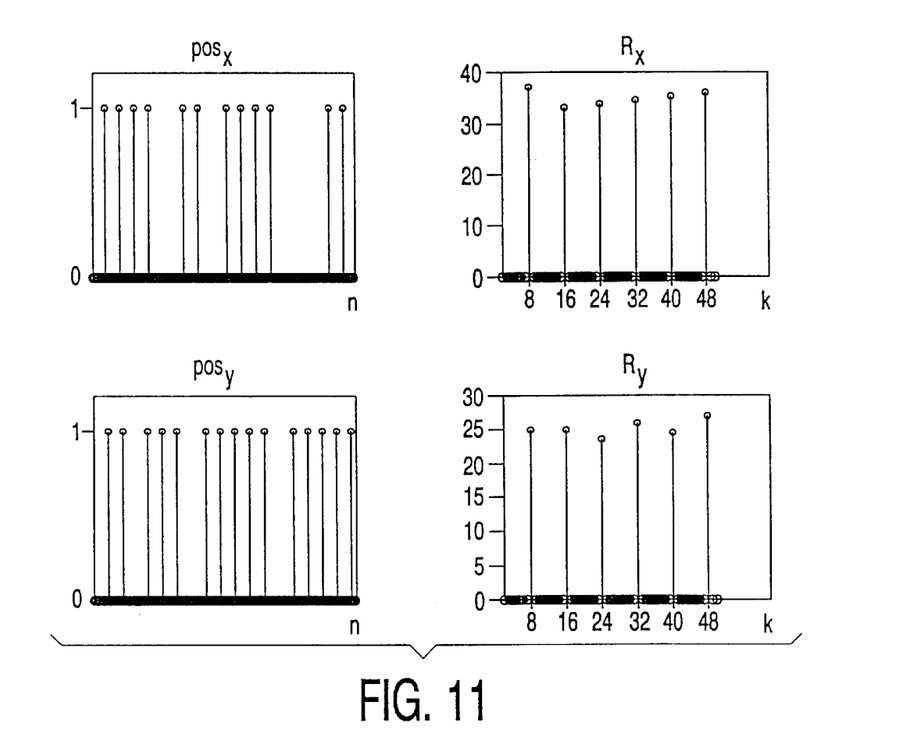
FIG. 11 shows an autocorrelation of the binary vector of FIG. 10.

As an example, FIG. 11 shows the result on a given coded scene after coding at 1.5 Mb/s. It has to be noted that $R_x(n)$ and $R_y(n)$ take a zero value for n≠k8, therefore the image is segmented into 8×8 size blocks.

4. Our method cannot be applied in a graphical image because an abrupt change in intensity slope is rather likely; hence, many sharp edges would be erroneously interpreted as blocking effect. Moreover, in these images, the variance in uniform areas takes a zero value; hence, the conditions (4.6) is verified for many pixels.

In order to distinguish a coded image between a graphical one, we observe that in the latter, the sharp edges can be located at any position; therefore, the autocorrelation of $pos_x$ and $pos_y$ takes a high value also for n=1 (see Eq. 4.8):

$$R_{x(1)} = \sum_{i=0}^{Nc} pos_x(i) \cdot pos_x(i+1)$$

$$R_y(1) = \sum_{i=0}^{Nr} pos_y(i) \cdot pos_y(i+1)$$

From the above consideration, it is simple to discriminate the different type of images; in fact the following three cases are possible:
(a) $N_{bl}+N_{ri}>>R_x(1)+R_y(1)\simeq 0$: the image is classified as a block coded image;
(b) $N_{bl}+N_{ri}>>0$ and $R_x(1)+R_y(1)>>0$: the image is classified as a graphical image;
(c) $N_{bl}+N_{ri}\simeq 0$: the image is classified as a real uncompressed image.

5. Conclusions

In this description, we have proposed a sharpness enhancement technique for video applications, taking into account the fact that the images can be blocked.

Conventional 2-D techniques for contrast sharpening cannot be applied to the enhancement of video image sequences. In fact, they introduce small artifacts and non-homogeneities which are perfectly acceptable in a still picture but become very visible and annoying in an image sequence; moreover, the visibility of a defect strongly depends on the sequence contents, namely on the amount of details and of motion.

A 3-D UM algorithm has been proposed in Section 2 in order to overcome such problems; despite its simple formulation, it is able to produce a good noise-insensitive sharpening action without introducing unpleasant overshoot and temporal artifacts. However, this operator cannot be applied to the enhancement of block-coded image sequences, because it emphasizes such coding artifacts that become very visible and annoying. For this task, a simple modification has been introduced when processing block-coded image sequences in order to emphasize the details and reduce the visibility of blocking and ringing effects (see Section 3).

Hence, in coded image sequences, the behavior of the filter ranges from a quasi-linear low-pass one in uniform areas, to a strongly nonlinear high-pass one in detailed areas. The variance detector that regulates the filter behavior is embedded in the filter itself, which allows a compact expression of the operator.

Finally, in order to define an enhancement technique for both the video and coded image sequences, a mechanism that allows the behavior of the filter to change according to the presence of the coding artifacts, has been inserted in the operator. To this purpose, a new distortion measure was introduced which does not need any information about the position and the size of the blocks. In fact, the major proposed algorithms to define a metric for blockiness suppose that the blocking artifacts are always located at block boundaries, but in video coding, the blocking artifacts can be located at any position due to the motion-compensated prediction. The algorithm has been evaluated by computer simulations and its results clearly show that it outperforms the existing algorithms. A specific component of the operator allows this technique to be employed for decoded sequences in a PC environment, also thanks to its low cost in terms of hardware and/or required processing power. The algorithm has proven to be robust against the heterogeneous contents of real sequences, giving very good performance even on very demanding images.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

REFERENCES

[1] A. K. Jain, Fundamentals of Digital Image Processing, Prentice Hall, Inc., Englewood Cliffs, N.J., 1989.
[2] W. K. Pratt, Digital Image Processing, John Wiely and Sons, New York, 1991.
[3] H. C. Andrews, A. G. Teschler, and R. P. Kruger, \Image processing by digital computer", IEEE Spectrum, vol. 9, July 1972, pp. 20–32.
[4] Y. H. Lee and S. Y. Park, "A study of Convex/Concave Edges and Edge-Enhancing Operator Based on the Laplacian", IEEE Trans. on Circuits and System, vol. 37, no. 7, July 1990, pp. 940–946.
[5] S. K. Mitra, H. Li, I. Li and T. Yu, "A new Class of Nonlinear Filters for Image Enhancement", Proc. Inter. Conf. on Acoust., Speech and Signal Processing, ICASSP-91, pp. 2525–2528, 1991.
[6] G. Ramponi, "A Cubic Unsharp Masking Technique for Contrast Enhancement", IEEE Trans. Signal Processing, Vol. 67, No. 2, June 1998, pp. 211–222.
[7] G. Ramponi and A. Polesel, "A Rational Unsharp Masking Technique" Journal of Electronic Imaging, vol. 7, no. 2, April 1998, pp. 333–338.
[8] F. Alaya Cheikh and M. Gabbouj, "Directional Unsharp Masking-Based Approach for Color Image Enhancement", Proc. of NM-BIA98, Glasgow, 1–3 Jul. 1998, pp. 173–178.

[9] G. T. Jaspers and Peter H. N. de With, "A generic 2D sharpness enhancement algorithm for luminance signal", Proc. IPA-97, IEE Conf., May 6, 1997.

[10] S. I. Olsen, "Noise Variance Estimation in Images", CVGIP, Vol. 4, No. 5, July 1993, pp. 521–528.

[11] R. M. Hodgson, D. G. Bailey. "Properties, implementations and application of rank filters", Image and Vision Computing, vol.3, no.1, February 1985.

[12] R. Rosenholtz and A. Zakhor, "Iterative procedures for reduction of blocking effects in transform image coding", IEEE Trans. Circuits Syst. Video Technol., vol. 2, pp. 91–95, March 1992.

[13] Y. Yang, N. P. Galatsanos, and A. K. Katsaggelos, "Regularized reconstruction to reduce blocking artifacts of block discrete cosine transform compressed images", IEEE Trans. Circuits Syst. Video Technol., vol. 3, pp. 421–432, December 1993.

[14] S. Marsi, R. Castagno, and G. Ramponi, "A Simple Algorithm for the Reduction of Blocking Artifacts in Images and its Implementation", IEEE Trans. on Consumer Electronics, vol. 44, no. 3, August 1998.

[15] S. Minami and A. Zakhor, "An optimization approach for removing blocking effects in transform coding", IEEE Trans. Circuits Syst. Video Technol., vol. 5, pp. 74–82, April 1995.

[16] B. Jeon and J. Jeon, "Blocking Artifacts Reduction in Image Coding Based on Minimum Block Discontinuity Criterion", SPIE Visual Communications and Image Processing, vol. 2501, pp.198–209, 1995.

[17] C. J. Kuo and R. J. Hsieh, "Adaptive postprocessor for block encoded images", IEEE trans. Circuits Syst. Video Technol., vol. 5, pp. 298–304, August 1995.

[18] H. R. Wu, M. Yuen, "A generalized block-edge impairment metric for video coding", IEEE Signal Processing, Vol. 4, No. 11, November 1997, pp. 317–320.

What is claimed is:

1. A method of sharpness enhancement, the method comprising the steps:

filtering an input signal to form a filtered signal;

multiplying the filtered signal by a controllable fraction to form a multiplied signal; and adding the multiplied signal to the input signal;

wherein the controllable fraction depends on a non-linear function, and wherein the filtering is a spatial filtering, and the method further comprises the steps:

temporally filtering the input signal to form a temporally filtered signal; and adding the temporally filtered signal to the input signal.

2. The method as claimed in claim 1, wherein the controllable fraction depends on an edge sensing function.

3. The method as claimed in claim 2, wherein the controllable fraction is smaller than its maximum value for edges smaller than a first threshold value.

4. The method as claimed in claim 2, wherein the controllable fraction is smaller than its maximum value for edges exceeding a second threshold value.

5. The method as claimed in claim 1, wherein the non-linear function depends on a thin line detection.

6. The method as claimed in claim 5, wherein the thin line detection is carried out on the filtered signal.

7. The method as claimed in claim 2, wherein the edge sensing function is variance-based.

8. The method as claimed in claim 7, wherein the controllable fraction is negative for signal variations smaller than a certain threshold.

9. A method of sharpness enhancement, the method comprising the steps:

filtering an input signal to form a filtered signal;

multiplying the filtered signal by a controllable fraction to form a multiplied signal; and adding the multiplied signal to the input signal;

wherein the controllable fraction depends on a non-linear function, and wherein the method further comprises the steps:

detecting a blocking and/or ringing effect including comparing mean values of adjacent pixel windows; and detecting a block size based on an autocorrelation of a vector indicating blocking and/or ringing effects.

10. The method as claimed in claim 9, wherein the blocking and/or ringing effect detecting step further includes comparing variances of the adjacent pixel windows to a threshold value.

11. A device for sharpness enhancement, the device comprising:

means for spatially filtering an input signal to form a filtered signal;

means for multiplying the filtered signal by a controllable fraction to form a multiplied signal;

means for adding the multiplied signal to the input signal;

means for generating the controllable fraction using a non-linear functions;

means for temporally filtering the input signal to form a temporally filtered signal; and means for adding the temporally filtered signal to the input signal.

12. A television apparatus, comprising:

a device for sharpness enhancement as claimed in claim 11; and means for displaying the sharpened signal.

* * * * *